(12) United States Patent
Bracamontes del Toro

(10) Patent No.: US 7,551,016 B2
(45) Date of Patent: Jun. 23, 2009

(54) PROGRAMMABLE CLOCK GENERATOR APPARATUS, SYSTEMS, AND METHODS

(75) Inventor: Rocendo Bracamontes del Toro, Ellicott City, MD (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/051,947

(22) Filed: Feb. 4, 2005

(65) Prior Publication Data
US 2006/0176097 A1 Aug. 10, 2006

(51) Int. Cl.
*G06F 1/04* (2006.01)
(52) U.S. Cl. .................................. 327/291; 327/299
(58) Field of Classification Search ................. 327/291, 327/293, 298, 299, 113–117, 119–122
See application file for complete search history.

(56) References Cited

U.S. PATENT DOCUMENTS

| 5,448,191 | A |  | 9/1995 | Meyer ........................ 327/105 |
| 5,451,912 | A | * | 9/1995 | Torode ................... 331/108 C |
| 5,519,859 | A |  | 5/1996 | Grace ......................... 395/600 |
| 5,546,576 | A |  | 8/1996 | Cochrane et al. ............ 395/600 |
| 5,719,510 | A |  | 2/1998 | Weidner ...................... 327/119 |
| 5,771,264 | A | * | 6/1998 | Lane ........................... 375/376 |
| 5,877,656 | A | * | 3/1999 | Mann et al. .................... 331/16 |
| 5,900,762 | A |  | 5/1999 | Ramakrishnan ............. 327/277 |
| 6,191,660 | B1 | * | 2/2001 | Mar et al. .................... 331/111 |
| 6,285,264 | B1 | * | 9/2001 | Mann ......................... 331/158 |
| 6,329,850 | B1 |  | 12/2001 | Mair et al. ................... 327/107 |
| 6,366,174 | B1 | * | 4/2002 | Berry et al. .................... 331/78 |
| 6,373,913 | B1 | * | 4/2002 | Lee ............................. 375/376 |
| 6,509,776 | B2 | * | 1/2003 | Kobayashi et al. .......... 327/277 |
| 6,525,615 | B1 |  | 2/2003 | Masenas et al. ............... 331/34 |
| 6,552,585 | B2 |  | 4/2003 | Poullet ....................... 327/115 |
| 6,594,330 | B1 |  | 7/2003 | Wilson ........................ 375/376 |
| 6,664,860 | B2 | * | 12/2003 | Fallisgaard et al. ........... 331/18 |

* cited by examiner

*Primary Examiner*—Lincoln Donovan
*Assistant Examiner*—Hai L. Nguyen
(74) *Attorney, Agent, or Firm*—Schwegman, Lundberg & Woessner P.A.

(57) ABSTRACT

An apparatus and method for generating local clock signals from system clock signals based upon user inputs that provide a frequency multiplier and a frequency divider. The frequency multiplier and frequency divider are stored in an interface. System clock signals are received and local clock signals are generated by the circuitry. The frequency of the local clock signals is equal to the frequency of the system clock signals multiplied by the frequency multiplier and divided by the frequency divider multiplied by two.

16 Claims, 6 Drawing Sheets

PROGRAMMABLE CLOCK GENERATOR APPARATUS, SYSTEMS, AND METHODS

FIELD OF THE INVENTION

This invention relates to circuitry that generates a local clock signal based upon system clock signals. More particularly, this invention relates to a circuitry that generates a local clock signal that may be a fraction or multiple of the rate of the system clock. Still more particularly, this invention relates to circuitry that generates a local clock signal from a system clock that is a faction or multiple of the frequency of the system clock that is compensated for temperature and process variation.

PROBLEM

Digital processing systems are constantly growing more complex to provide more features to do current processes faster. One result of the growing complexity of digital processing systems is that more circuitry is being added to the digital processing system that do not operate at the frequency of a system clock. For example, many digital processing systems now have Application Specific integrated circuits (ASICs) or other integrated circuits that perform a specific function. For example, a router may include an ASIC that reads source and destination addresses from received packets.

Thus, those skilled the in art must provide solutions for providing local clock signals to an ASIC or other circuit that operates at a frequency different from the frequency of the system clock. Most prior art solutions generate a local clock signal using signals from the system clock and a static buffer chain. A static buffer chain is an oscillator that generates signals at one known frequency. The use of a static buffer chain has many problems.

A first problem with a static oscillator is that the oscillator consumes a lot of power to generate the signals. A second problem with a static oscillator is that the generated local frequencies can only be a factor of $2^n$ of the system frequency. A third problem is that analog circuits such a phase-lock loop are needed to generate the local clock signals.

Thus, those skilled in the art are constantly trying to find methods for conserving power to generate the local signals and methods for providing local clock signals that have a frequency that is a fractional ratio of the system clock.

SUMMARY OF THE INVENTION

The above and other problems are solved and an advance in the art is made by a method and apparatus for generating a local clock signal in accordance with this invention. A first advantage of a local clock signal generation method and apparatus in accordance with this invention is that a local clock signal having a fractional ratio of the system clock frequency can be generated. A second advantage of this invention is that the produced local clock signals may be adjusted to a target frequency to compensate for temperature and process variations. A third advantage is that all digital components may be used to reduce power consumption. A fourth advantage is that the frequency of the local clock signal generated may be changed through user input. A fifth advantage of this invention is that jitter is greatly reduced.

In accordance with this invention, local clock signals are generated from system clock in the following manner. Circuitry in accordance with this invention receives and stores a frequency multiplier and a frequency divider. Circuitry then receives the system clock signal and generates local signals that have a frequency of the frequency of the system clock signals multiplied by the frequency multiplier and divided by the frequency divider. In an exemplary embodiment the frequency of the local clock signals may be expressed as the frequency of the system clock signals multiplied by frequency multiplier divided by the frequency divider multiplied by two. Circuitry then monitors the output local clock signals and adjusts the generating circuitry to converge on the target frequency to adjust for temperature and process variations.

In accordance with an exemplary embodiment of this invention, a circuit for generating the local clock signals in accordance with this invention is configured in this manner. The circuit includes a processor interface, a control unit, a programmable buffer chain, a reset oscillator, and a binary clock divider. The processor interface includes registers for storing the frequency multiplier and frequency divider. The control unit receives the system clock signals and the frequency multiplier and generates tap control signals and reset signals.

The programmable buffer chain receives the tap control signals from the control unit and includes circuitry that generates clock signals having a frequency that is equal to the frequency of the system clock signals multiplied by the frequency multiplier. The reset buffer chain includes the same circuitry as the programmable buffer chain and generates a reset signal on the rising edge of the reset signal generated by the control unit and transmits the reset signal to the programmable buffer chain.

A clock divider is a mod frequency divider multiplied by two counter that receive the clock signals generated by the programmable buffer chain and generates the local clock signals.

BRIEF DESCRIPTION OF THE DRAWINGS

The above and other advantages and features in accordance with this invention are described in the following detailed description and shown in the following drawings.

DETAILED DESCRIPTION

This invention relates to a method and circuitry for generating local clock signals from system clock signals based upon user input. The following is a description of this invention. For clarity, components shown on more than one figure are given the same reference number throughout the description.

Figure 1:
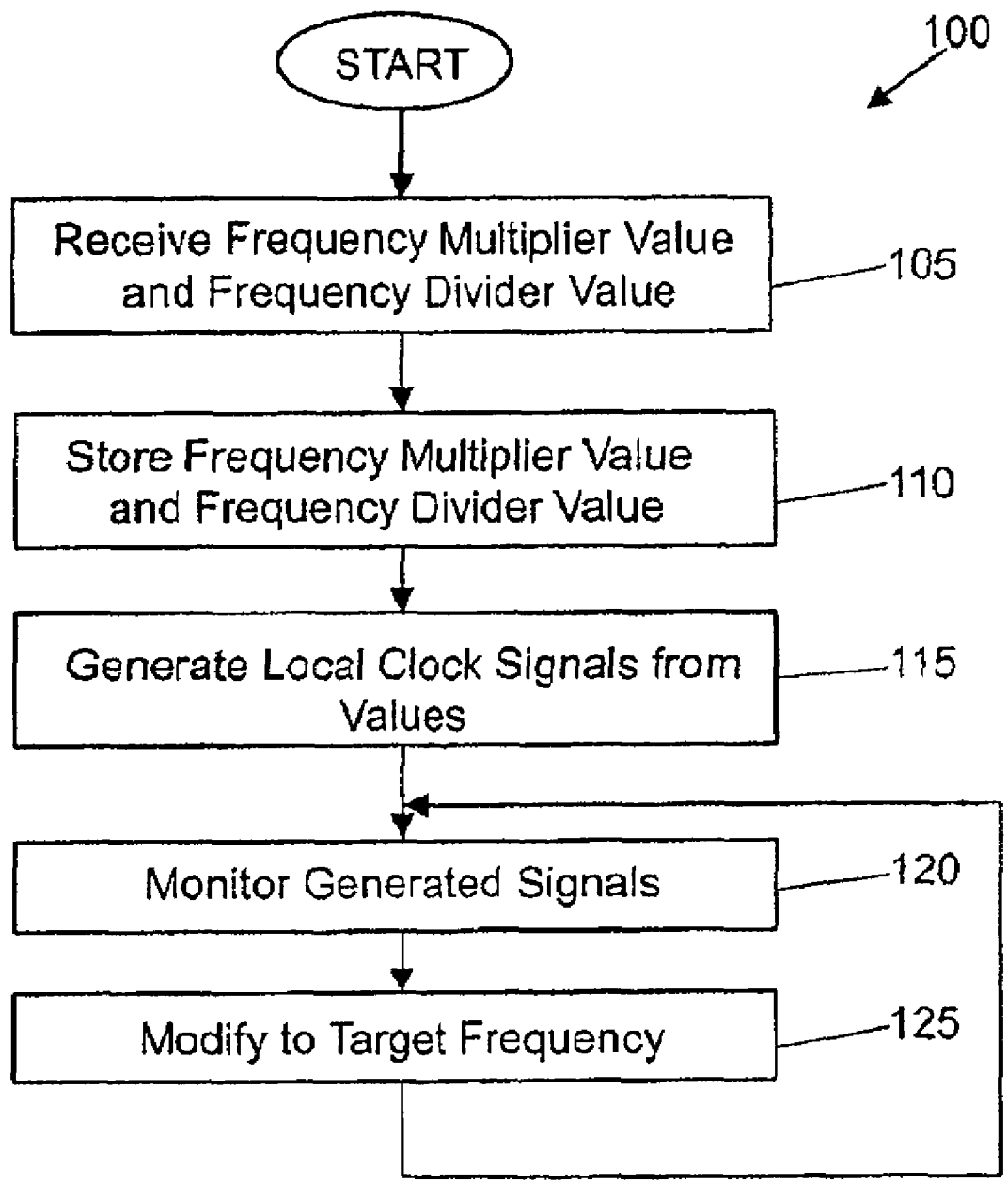
FIG. 1 illustrating a flow diagram for a method of generating local clock signals from system clock signals in accordance with this invention.

FIG. 1 illustrates an overview of the method for generating local clock signals in accordance with this invention. Process 100 begins in step 105 by receiving user input that includes a frequency multiplier value and a frequency divider value. These values will be used to determine a target frequency for the local clock signals as described below.

In step 110, the frequency multiplier value and frequency divider value are stored in a memory for use. In a preferred exemplary embodiment, the frequency multiplier and divider values are received by a software interface module and stored in registers in the module.

In step 115, local clock signals are generated from received system clock signals. The local clock signals are generated having a frequency based upon the frequency of the system clock signals multiplied by the frequency multiplier and then divided by the frequency divider. In a preferred exemplary embodiment, the target frequency for the local clock signals is expressed by the following equation:

$$Frequency_{local} = M * frequency_{system}/2 * D$$

Where:
Frequency$_{local}$=frequency of local clock signals;
Frequency$_{system}$=frequency of system clock signals;
M=frequency multiplier value; and
D=frequency divider value.

A description of the generation of local clock signals having this frequency is provided by the circuitry of an exemplary embodiment described below.

In step 120, the generated local clock signals are monitored to determine the actual frequency of the generated signals. The generated signals are then adjusted in step 125 to change the frequency to the target frequency. This adjusts the frequency of the local clock signals for temperature and process variations. Steps 120 and 125 are then continuously repeated.

Figure 2:
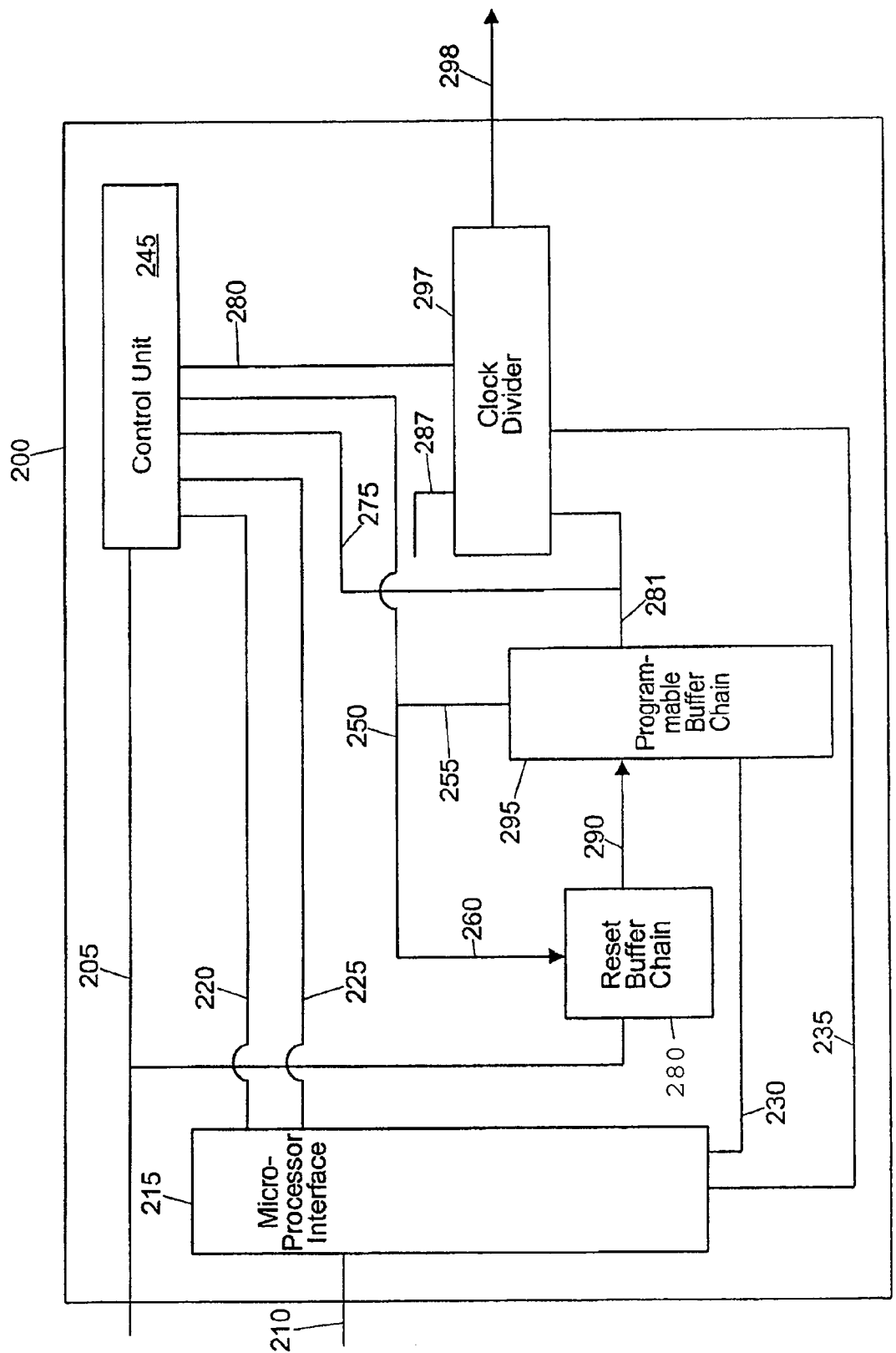
FIG. 2 illustrating a block diagram of components of circuitry for generating local clock signals from system clock signals in accordance with an exemplary embodiment of this invention.

FIG. 2 illustrates a block diagram of circuitry 200 for generating local clock signals in accordance with this invention. Circuitry 200 includes microprocessor interface 215, control unit 245, reset buffer chain 270, programmable buffer chain 295 and clock divider 297.

Circuitry 200 receives system clock signals via path 205 and data from the software via path 210. Local clock signals are output from circuitry 20 via path 298. Control unit 245 receives system clock signals via path 205. Microprocessor interface 215 transmits a lock enable signal to control unit 245 via path 220 and transmits the frequency multiplier value to control unit 245 via path 225. Control unit 245 also receives the clock signals generated by programmable buffer chain 295 via path 275. Control unit 245 uses the system clock signals, clock signals generated by the programmable buffer chain, and frequency multiplier value to generate tap control signals.

Control unit 245 transmits the tap control signals to programmable buffer chains via path 255 and to reset buffer chain via 260. Control unit 245 also generates reset cycle signals from the received inputs and transmits the reset cycle signals to reset buffer chain 270 via path 250.

Programmable buffer chain 295 receives a power-save signal from microprocessor interface 215 via path 230. Reset buffer chain transmits reset clock signals to programmable buffer chain via path 290. A reset signal is received by programmable buffer chain via path 286. Programmable buffer chain 295 also receives tap control signals via path 255. Clock signals having a frequency that is equal to the frequency of the system clock signals multiplied by the frequency multiplier are generated by the programmable buffer chain clock signals from the received signals. These clock signals are output via path 281.

Reset buffer chain 270 receives tap control signals from control unit 245 via path 260. Reset cycle signals are received by reset buffer chain 270 from control unit 245 via path 250. The reset buffer chain generates a rest signal from the tap control signals on every rising edge of a reset cycle generated by control unit 245. The reset signal is then transmitted to programmable buffer chain 295 via path 290.

Clock divider 297 receives the clock signals generated by programmable buffer chain via path 281. A lock status signal is received by clock divider 297 from control unit 245 via path 280. A reset signal is received via path 287 by clock divider 297. The frequency divider stored in microprocessor 215 is received by clock divider 297 via path 235. The clock divider is a binary clock divider that uses the input signals to generate a lock clock signal having a frequency that is equal to the frequency of system clock signals multiplied by the frequency multiplier and divided by the frequency divider multiplied by two. The local clock signals are then output from circuitry 200 via path 298.

Figure 3:
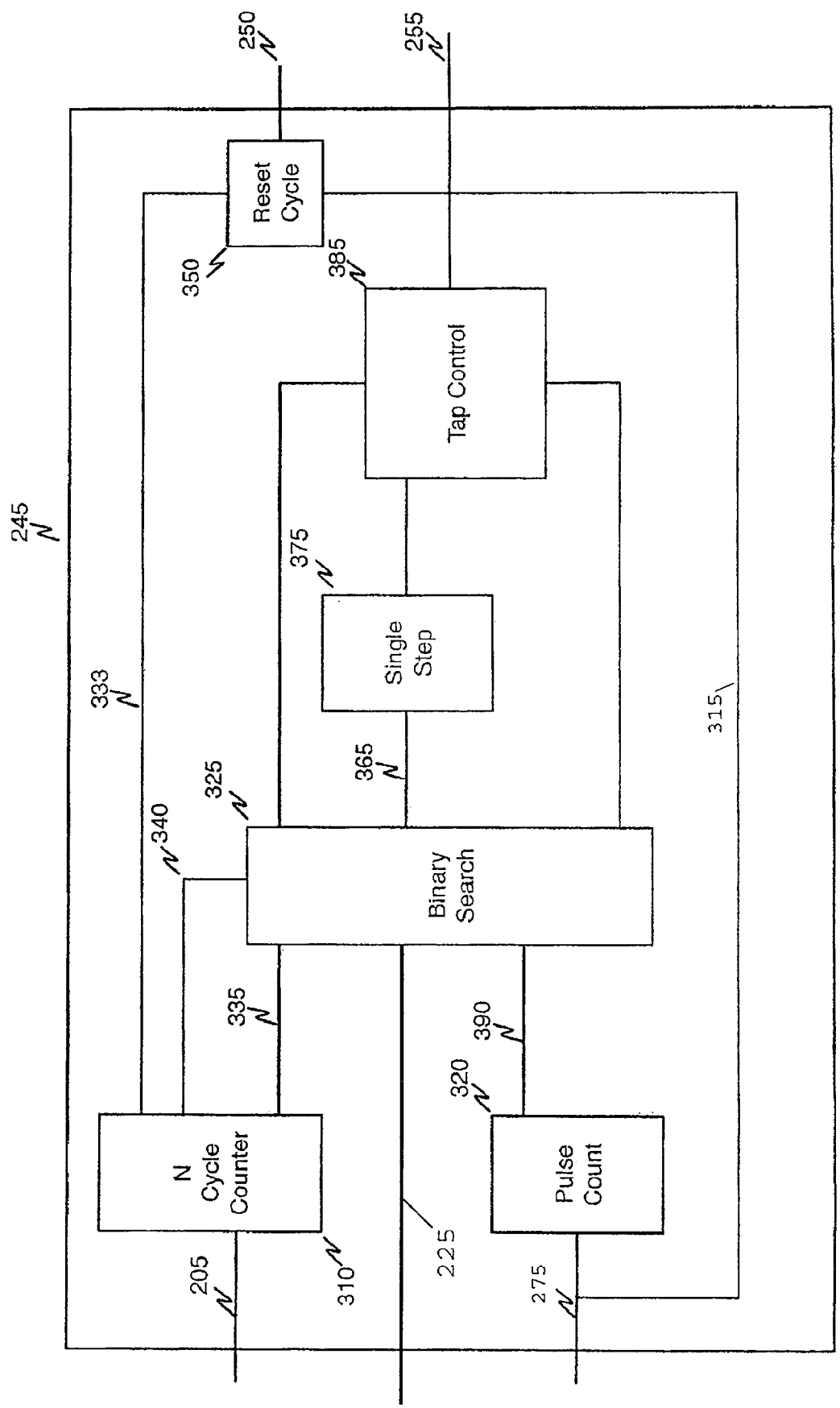
FIG. 3 illustrating a block diagram of a control unit in the circuitry for generating local clock signals in accordance with the exemplary embodiment of this invention.

FIG. 3 illustrates a block diagram of the components of control unit 245 in an exemplary embodiment of this invention. Control unit 245 is a module of circuitry that controls and monitors the operation of programmable buffer chain 295. This allows control unit 245 to modify the local clock signals to compensate for temperature and process variations. Control unit 245 includes N_cycle counter 310, pulse counter 320, binary search module 325, single step search module 375, tap control signal generating circuitry 385 and reset cycle generating circuitry 350. Control unit 245 receives system clock signals via path 205 and the frequency multiplier via path 225. Control unit 245 also outputs reset cycle signals via path 250 and tap control signals via path 255.

N_cycle counter 310 is a counter circuit that counts the number of system clock signals received by the control unit and generates a signal transmitted to reset cycle circuitry 350 on every Nth system clock signal received. The system clock signals are counted because a programmable buffer chain must be reset every N_cycles of the system clock in order to minimize recursive errors. The recursive errors may be caused by small changes in the delay through the chain of buffers inside programmable buffer chain 295.

Figure 4:
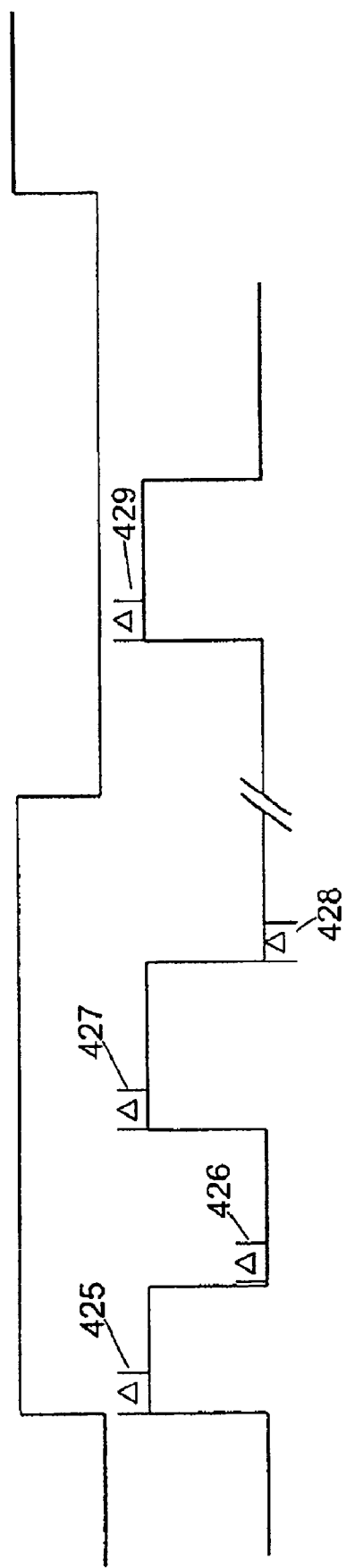
FIG. 4 illustrating a timing diagram showing clock signals generated by the circuitry compared to system clock signals.

N is determined based upon the amount of error that is desired in the frequency of the output local clock signals. Error or "Δ" accumulates every cycle generated by programmable buffer chain 295. FIG. 4 illustrates the accumulation of the errors 425-429 in the clock signals generated by programmable buffer chain 295 compared to the system clock signals 205.

In an exemplary embodiment the desired amount of error is 1%. Thus, if Δm represents 1% of ts, where ts is a half cycle of the clock signals generated by programmable buffer chain 295 then:

$$\Delta x = ts/100$$

from this it can be concluded that $$\Delta m = \Sigma_{I=1}^{i=M} = 2\Delta xi = 2M\Delta x; \text{ and}$$

$$ts = tosc/2M$$

where M equals the frequency multiplier value; ts is a half period of the produced frequency; and tosc is a half-period of the clock signals generated by programmable buffer chain 295.

In order to calculate the number of cycles necessary to detect 1% error at N number of half cycles of the generated clock cycles must be accumulated. This is determined by the following equation:

$$N(\Sigma_{I=1}^{i=M} 2\Delta xi) = ts$$

By substitution, this equation can be reduced to:

$N(2M\Delta x) = tosc/2M$

Solving for N gives the following result:

$N = tosc/4\Delta x M^2$

This can be resolved by substituting $\Delta x$ to give the number of cycles, N, needed to detect 1% error which is given by:

$N = 50/M.$

Thus, N_cycle counter 310 generates a signal every 50/M system clock signals counted. The signal is transmitted via path 333 to reset cycle circuitry 350.

Pulse counter 320 receives the clock signals generated by programmable buffer chain 295 via path 275. Pulse counter 320 is high speed count circuitry that records the number of clock signals generated by every N_cycle. The generated count is transmitted to binary search circuit 325 via path 390. Pulse counter 320 is a rising edge of the Nth system clock signal.

Binary search circuit 325 sets the appropriate tap control value transmitted to programmable buffer chain 295 and reset buffer chain 285. Binary search circuit 325 receives the frequency multiplier value via path 225. Binary search circuit 325 also receives a target value from N-cycle counter 310 via paths 335 and 340. The target value is M*N or the frequency Multiplier value multiplied by the number, N, of system clock cycles need to detect error. A binary search is used to set the tap control value in the exemplary embodiment because the binary search is the fastest algorithm when a k-bit bus is used to transmit the tap control value. Since a binary search is used, the maximum number of cycles needed to lock the oscillator is k*target which is equal to k*M*N. In a referred exemplary embodiment, the tap control signals are transmitted by a bus having 12 bits Thus lock of the oscillator is achieved in M*N*12 cycles.

Single step search circuit 375 receives tap control signals from binary search circuit 325 via path 365. Single step search circuit 375 provides a single step-up or a single step down to correct possible incremental error. This error is corrected on the rising edge of every Nth cycle of the system clock.

Reset cycle circuitry 350 receives the signals generated by programmable buffer chain 295 via path 315 and signals from N-cycle counter via path 333. Reset cycle circuitry 350 then issues a reset cycle signal on the rising edge of the Nth cycle of the system clock if needed on path 250.

Figure 5:
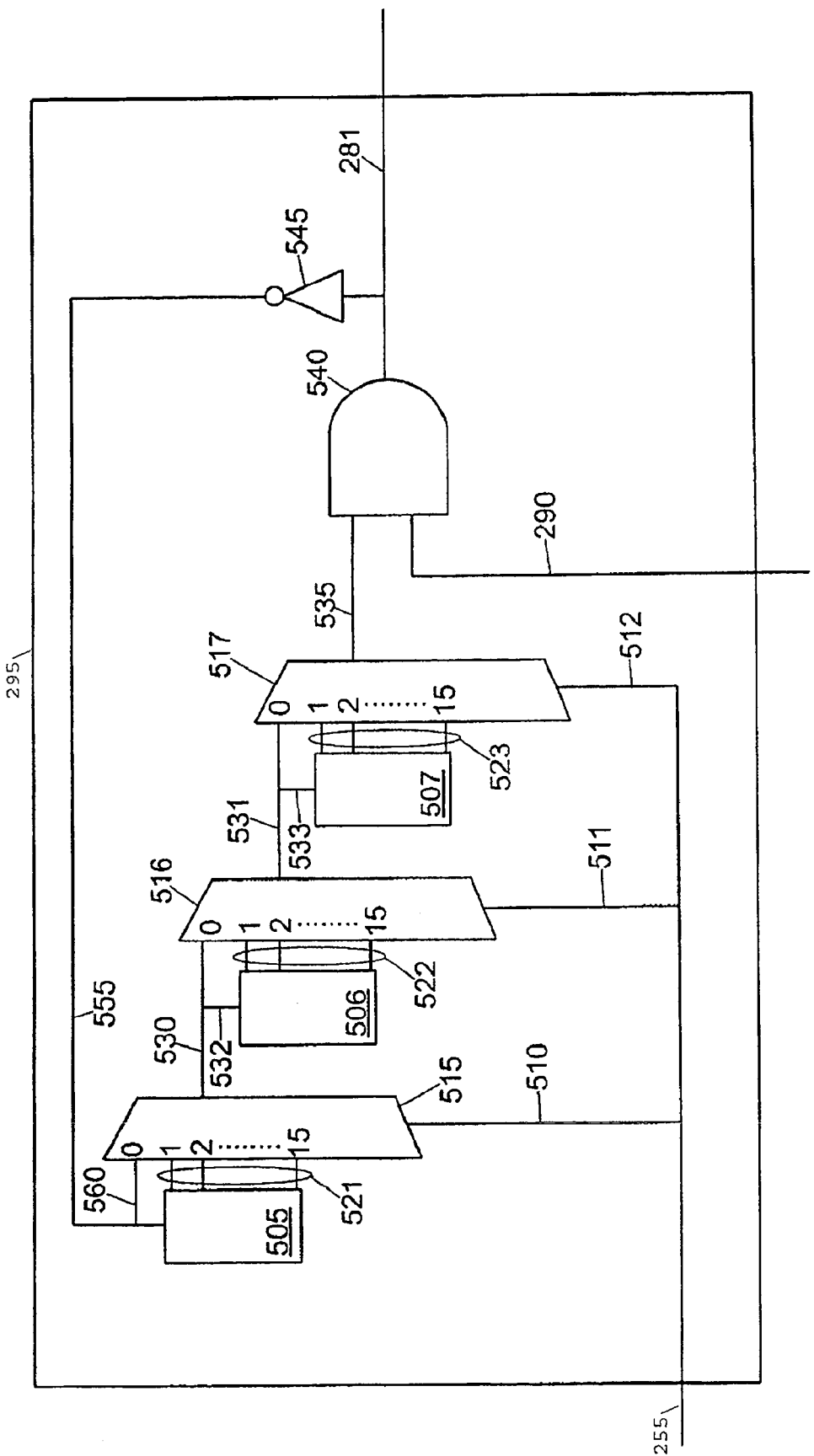
FIG. 5 illustrating a block diagram of components of a programmable buffer chain in accordance with the exemplary embodiment of this invention.

FIG. 5 illustrates programmable buffer chain 295 in accordance with an exemplary embodiment of this invention. Programmable buffer chain 295 is digital buffer chain. Programmable buffer chain 295 includes a series of tap delay circuits 505-507, a series of multiplexors 515-517, AND gate 540, and inverter 545. Programmable buffer chain 295 receives tap control signals via path 255 and reset oscillator signals via path 290. Programmable buffer chain 295 outputs clock signals via path 281.

The first tap delay 505 receives feedback signals via path 555 and generates outputs that are transmitted to multiplexor 515 via paths 521. Multiplexor 515 receives feedback signals via path 560 and the output of first tap delay 505 via path 521. The signals output by first multiplexor 515 are determined by a portion of the tap control signals received via path 510. In an exemplary embodiment, first multiplexor 515 receives 1/kth of the k tap control signals. In this embodiment, multiplexor 515 receives the 1/kth most significant bits of the tap control signals. For example, if there are 12 tap control bits, multiplexor 515 receives the $8^{th}$ through $11^{th}$ bits. The tap control signals control the signal output by multiplexor 515 via path 530.

Second tap delay circuit 506 receives the output of multiplexor 515 via paths 530 and 532. Second tap delay circuit 506 generates output signals transmitted to second multiplexor 516 via paths 522. Second multiplexor 516 receives the output of first multiplexor 515 via path 530 and the outputs of second tap delay circuit 506 via paths 522. The signals output by second multiplexor 516 are determined by a portion of the tap control signals received via path 511. In an exemplary embodiment, multiplexor 516 1/kth of the k tap control signals. In this embodiment, second multiplexor 516 receives the $2^{nd}$ 1/kth most significant bits of the tap control signals. For example, if there are 12 tap control bits, multiplexor 516 receives the $4^{th}$ through $7^{th}$ bits. The tap control signals control the signal output by second multiplexor 516 via path 531.

Third tap delay circuit 507 receives the output of second multiplexor 516 via paths 531 and 533. Third tap delay circuit 507 generates output signals transmitted to third multiplexor 517 via paths 527. Third multiplexor 517 receives the output of second multiplexor 516 via path 531 and the outputs of third tap delay circuit 507 via paths 523. The signals output by third multiplexor 517 are determined by a portion of the tap control signals received via path 512. In an exemplary embodiment, third multiplexor 517 receives 1/kth of the k tap control signals. In this embodiment, third multiplexor 516 receives the 1/kth least significant bits of the tap control signals. For example, if there are 12 tap control bits, multiplexor 517 receives the $0^{th}$ through 3rd bits. The tap control signals control the signal output by third multiplexor 517 via path 535.

AND gate 540 receives the reset buffer chain signals via path 290 and the output of the series of multiplexors via path 535. AND gate logically and the signals and generates the output clock signals applied to path 281. Path 555 provides a feedback of the output signal applied to path 281. Path 555 is connected to an input of inverter 545. Inverter 545 provides a one cycle delay in the signal and applies the feedback signal to path 555.

The following shows calculation of the frequency of clock signals generated by programmable buffer chain 295 in terms of taps.

The delay magnitude of the first tap is termed tda. The delay magnitude of the second tap is termed tdb and the delay magnitude of the third tap is tdc. The delay magnitudes must follow the following rules $tdb = tda/10;$ and $tdc = tdb/10 = tba/100.$ The frequency of the clock signals generated by the programmable buffer chain is given by the following equation:

$Frequency_{multi} = 1/(2*delaychain)$

Where:

$Frequency_{multi}$ = frequency of the clock signals generated; and $Delaychain = (((\Sigma_0^{|SB2|} tda) + (\Sigma_0^{|SB1|} tdb) + (\Sigma_0^{|SB0|} tdc) + feedback)$ Where:
Delaychain = amount of delay;
SB1 = 1/kth most significant bits of tap control bits;
SB2 = 1/kth second most significant bits of tap control bits; and SB3=1/kth least significant bits of the tap control bits.

Through substitution delaychain may be expressed in terms of tda:

$$\text{Delaychain} = (((\Sigma_0^{|SB2|}tda) + (\Sigma_0^{|SB1|}tda/10) + (\Sigma_0^{|SB0|}tda/100) + \text{feedback});$$

Substituting for delaychain in the frequency equation gives the following equation for determining the frequency of the clock signals generated by programmable buffer chain 295:

$$\text{Frequency}_{mult} = 1/(2*(((\Sigma_0^{|SB2|}tda) + (\Sigma_0^{|SB1|}tda/10) + (\Sigma_0^{|SB0|}tda/100) + \text{feedback})).$$

The above equation shows that the frequency of the clock signals generated by programmable buffer chain 295 increases and decreases with a high precision when the TDC stage is used in combination with the least significant bits of the tap control bits.

Figure 6:
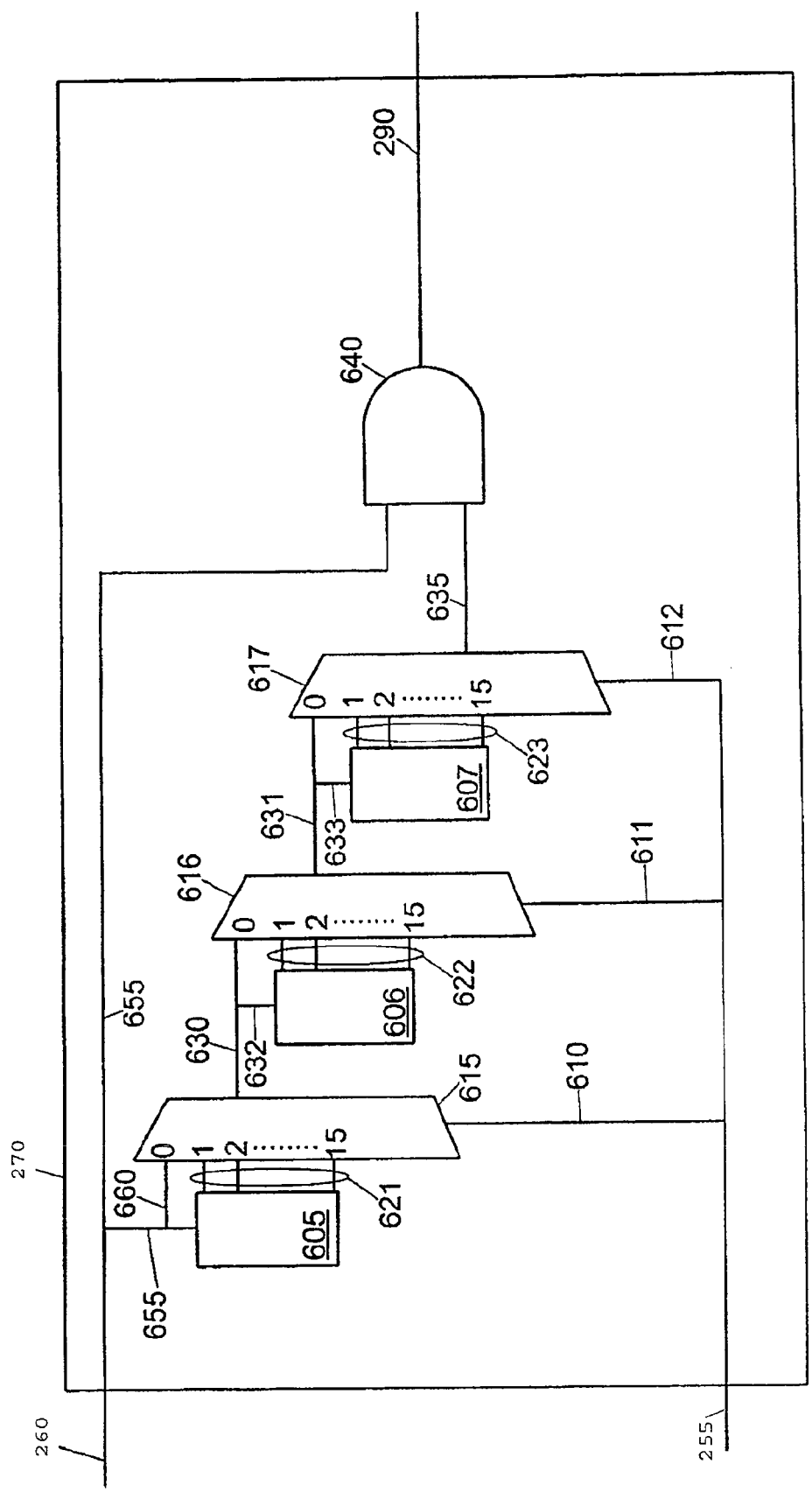
FIG. 6 illustrating a block diagram of components of a reset buffer chain in accordance with the exemplary embodiment of this invention.

FIG. 6 illustrates reset buffer chain 285 in accordance with an exemplary embodiment of this invention. Reset buffer chain 285 is a digital buffer chain that replicates the components of programmable buffer chain 295 in order to match initialization. Reset buffer chain 285 generates a reset signal that is transmitted to programmable buffer chain 295 on every rising edge of a reset cycle signal received from control unit 245.

Reset buffer chain 285 includes a series of tap delay circuits 605-607, a series of multiplexors 615-617, and AND gate 640. Reset buffer chain 285 receives tap control signals via path 260 and reset cycle signal via path 250. Reset buffer chain 285 outputs rest signals via path 290.

The first tap delay 605 receives the reset cycle signals via path 655 and generates outputs that are transmitted to multiplexor 615 via paths 621. Multiplexor 615 receives feedback signals via path 660 and the output of first tap delay 605 via path 621. The signals output by first multiplexor 615 are determined by a portion of the tap control signals received via path 610. In an exemplary embodiment, first multiplexor 615 1/kth of the k tap control signals. In this embodiment multiplexor 615 receives the 1/kth most significant bits of the tap control signals. For example, if there are 12 tap control bits, multiplexor 615 receives the $8^{th}$ through $11^{th}$ bits. The tap control signals control the signal output by multiplexor 615 via path 630.

Second tap delay circuit 606 receives the output of multiplexor 615 via paths 630 and 632. Tap delay circuit 606 generates output signals transmitted to second multiplexor 616 via paths 622. Second multiplexor 616 receives the output of first multiplexor 615 via path 630 and the outputs of second tap delay circuit 606 via paths 622. The signals output by second multiplexor 616 are determined by a portion of the tap control signals received via path 611. In an exemplary embodiment, multiplexor 616 1/kth of the k tap control signals. In this embodiment, second multiplexor 516 receives the $2^{nd}$ 1/kth most significant bits of the tap control signals. For example, if there are 12 tap control bits, multiplexor 616 receives the $4^{th}$ through $7^{th}$ bits. The tap control signals control the signal output by second multiplexor 616 via path 631.

Third tap delay circuit 607 receives the output of second multiplexor 616 via paths 631 and 633. Third tap delay circuit 607 generates output signals transmitted to third multiplexor 617 via paths 627. Third multiplexor 617 receives the output of second multiplexor 616 via path 631 and the outputs of third tap delay circuit 607 via paths 623. The signals output by third multiplexor 617 are determined by a portion of the tap control signals received via path 612. In an exemplary embodiment, third multiplexor 617 receives 1/kth of the k tap control signals. In this embodiment, third multiplexor 616 receives the 1/kth least significant bits of the tap control signals. For example, if there are 12 tap control bits, multiplexor 617 receives the $0^{th}$ through $3^{rd}$ bits. The tap control signals control the signal output by third multiplexor 617 via path 635.

AND gate 640 receives the reset cycle signals via path 655 and the output of the series of multiplexors via path 635. AND gate logically ands the signals and generates reset clock signals applied to path 290.

The above describes exemplary embodiments of this invention. It is envisioned that one skilled in the art can and will design alternative embodiments that infringe this invention as set forth in the following claims either literally or through the Doctrine of Equivalents.

What is claimed is:

1. A clock circuit comprising:
   a microprocessor interface to receive a frequency multiplying value and a frequency dividing value from a user, and to store said frequency multiplying value and said frequency dividing value;
   a control unit to receive a system clock signal, a buffer chain clock signal, and said frequency multiplying value, and to output tap control signals;
   a programmable buffer chain to generate said buffer chain clock signal using said tap control signals, wherein said buffer chain clock signal has a multiplier frequency based upon a frequency of said system clock signal and said frequency multiplying value; and
   a clock divider to generate an output clock signal as a local clock signal having a frequency that is based upon said multiplier frequency divided by said frequency dividing value.

2. The clock circuit of claim 1, further comprising:
   a reset buffer chain to generate reset clock signals for transmission to said programmable buffer chain.

3. The clock circuit of claim 1, wherein said control unit is to transmit signals to said programmable buffer chain to correct said multiplier frequency for temperature.

4. The clock circuit of claim 1, wherein said control unit is to transmit signals to said programmable buffer chain to correct said multiplier frequency for process variations.

5. The clock circuit of claim 1, wherein said control unit is to output reset cycle signals.

6. The clock circuit of claim 5, wherein said control unit comprises:
   a N-cycle counter to receive said system clock signals, to count cycles of said system clock signals, and to generate reset cycle circuitry signals after a predetermined number of cycles.

7. The clock circuit of claim 6, wherein said predetermined number of cycles is calculated by dividing a total oscillation period by a selected amount of error multiplied by four times the square of said frequency multiplying value.

8. The clock circuit of claim 6, wherein said control unit comprises:
   a pulse counter to receive and to count cycles of said buffer chain clock signal, and to generate a signal that indicates a number of said cycles of said buffer chain clock signal.

9. The clock circuit of claim 8, wherein said control unit comprises:
   a binary search module to receive said signal from said N_cycle counter, said signal from said pulse counter, and an N_counter target, and to generate a tap control signal that includes a tap control value.

10. The clock circuit of claim 9, wherein said control unit further comprises:

a single step module to receive said tap control signal from said binary search module, to perform one of a step-up or step-down of the tap control signal to correct for errors, to transmit a stepped tap control signal to a buffer chain tap control module that receives a control signal from said binary search module and said stepped tap control signal from said single search module, and to selectively transmit a tap signal output comprising one of said tap control signal and said stepped tap control signal.

11. The clock circuit of claim 10, wherein said control unit further comprises:
a reset cycle module to receive said reset cycle circuitry signals from said N-cycle counter and said buffer chain clock signal, and to generate a reset signal.

12. The clock circuit of claim 10, wherein said programmable buffer chain comprises:
a plurality of tap delay modules that generate a plurality of signals based upon the tap signal output received over a plurality of inputs wherein a first of said plurality of tap delay modules has an input connected to an output of said buffer chain; and
a plurality of mutliplexors connected in a series wherein inputs of each of said plurality of multiplexors except said first of said plurality of multiplexors in said series is connected to an output of a previous one of said plurality of multiplexors in said series and a plurality of outputs of one of said plurality of tap delay modules and an input of said first one of said plurality of multiplexors in said series is connected to said output of programmable buffer chain and said plurality of outputs of one of said plurality of tap delay modules, wherein outputs of each of said plurality of mutliplexors is connected to an input of one of said plurality of tap delay modules connected to a subsequent one of said plurality multiplexors in said series and an input of said subsequent one of said plurality of multiplexors and an output of a last one of said plurality of multiplexors in said series is connected to said output of said programmable buffer chain.

13. A method for generating an output clock signal from a system clock signal, the method comprising:
receiving and storing an input including a frequency multiplying value and a frequency dividing value at a microprocessor interface;
receiving a system clock signal;
receiving tap control signals to generate a buffer chain clock signal that has a multiplier frequency based upon a frequency of the system clock signal and the frequency multiplying value, the buffer chain clock signal to be provided by a programmable buffer chain that operates to correct the multiplier frequency; and
generating a local clock signal wherein said local clock signal has a local frequency that is derived from a frequency of said system clock signal multiplied by said frequency multiplying value and divided by said frequency dividing value.

14. The method of claim 13, further comprising:
monitoring said local clock signal; and
adjusting said local clock signal to adjust said local frequency for temperature variations.

15. The method of claim 13, further comprising:
monitoring said local clock signal; and
adjusting said local clock signal to adjust said local frequency for process variations.

16. The method of claim 13, wherein said local frequency is equal to said frequency of said system clock signal multiplied by said frequency multiplying value and divided by a quantity of said frequency dividing value multiplied by two.

* * * * *

UNITED STATES PATENT AND TRADEMARK OFFICE
CERTIFICATE OF CORRECTION

PATENT NO. : 7,551,016 B2  Page 1 of 1
APPLICATION NO. : 11/051947
DATED : June 23, 2009
INVENTOR(S) : Rocendo B. Del Toro It is certified that error appears in the above-identified patent and that said Letters Patent is hereby corrected as shown below:

In column 4, line 24, delete "N_cycle" and insert -- N-cycle --, therefor.

In column 4, line 31, delete "N_cycle" and insert -- N-cycle --, therefor.

In column 4, line 36, delete "N_cycles" and insert -- N-cycles --, therefor.

In column 5, line 11, delete "N_cycle" and insert -- N-cycle --, therefor.

In column 5, line 17, delete "N_cycle." and insert -- N-cycle. --, therefor.

In column 5, line 35, delete "bits" and insert -- bits. --, therefor.

In column 6, line 55, delete "Frequency$_{multi}$" and insert -- Frequency$_{mult}$ --, therefor.

In column 8, line 63, in Claim 9, delete "N_cycle" and insert -- N-cycle --, therefor.

In column 9, line 22, in Claim 12, delete "mutliplexors" and insert -- multiplexors --, therefor.

In column 9, line 32, in Claim 12, delete "mutliplexors" and insert -- multiplexors --, therefor.

Signed and Sealed this

Twentieth Day of October, 2009

David J. Kappos
*Director of the United States Patent and Trademark Office*